United States Patent
Smith et al.

(10) Patent No.: US 7,146,002 B1
(45) Date of Patent: Dec. 5, 2006

(54) CUSTOMER SERVICE TRANSACTION HANDLING BASED ON TRANSACTION HISTORY

(75) Inventors: Carline A. Smith, Roanoke, TX (US); George Gleason, Fort Worth, TX (US); Susan Lawrence, Grapevine, TX (US)

(73) Assignee: American Airlines, Inc., Fort Worth, TX (US)

( * ) Notice: Subject to any disclaimer, the term of this patent is extended or adjusted under 35 U.S.C. 154(b) by 144 days.

(21) Appl. No.: 10/881,571

(22) Filed: Jun. 30, 2004

(51) Int. Cl.
*H04M 3/00* (2006.01)
(52) U.S. Cl. .............................. 379/265.13; 379/266.02
(58) Field of Classification Search .................... None
See application file for complete search history.

(56) References Cited

U.S. PATENT DOCUMENTS

| | | | |
|---|---|---|---|
| 2002/0087393 A1* | 7/2002 | Philonenko | 705/11 |
| 2002/0131399 A1* | 9/2002 | Philonenko | 370/351 |
| 2004/0193468 A1* | 9/2004 | Mosquera et al. | 705/8 |
| 2004/0250085 A1* | 12/2004 | Tattan et al. | 713/186 |
| 2005/0163302 A1* | 7/2005 | Mock et al. | 379/211.02 |
| 2005/0192851 A1* | 9/2005 | Rangnekar | 705/5 |

* cited by examiner

*Primary Examiner*—Creighton Smith
(74) *Attorney, Agent, or Firm*—Haynes and Boone, LLP

(57) ABSTRACT

A method of routing a plurality of calls received by a call routing system, including grouping each of the plurality of received calls based on a plurality of customer classifications each associated with one of a plurality of customers each corresponding to one of the plurality of received calls. Each of the plurality of received calls are ranked based on a plurality of transaction histories each associated with one of the plurality of customers. Each of the plurality of received calls are routed based on the grouping and the ranking.

42 Claims, 3 Drawing Sheets

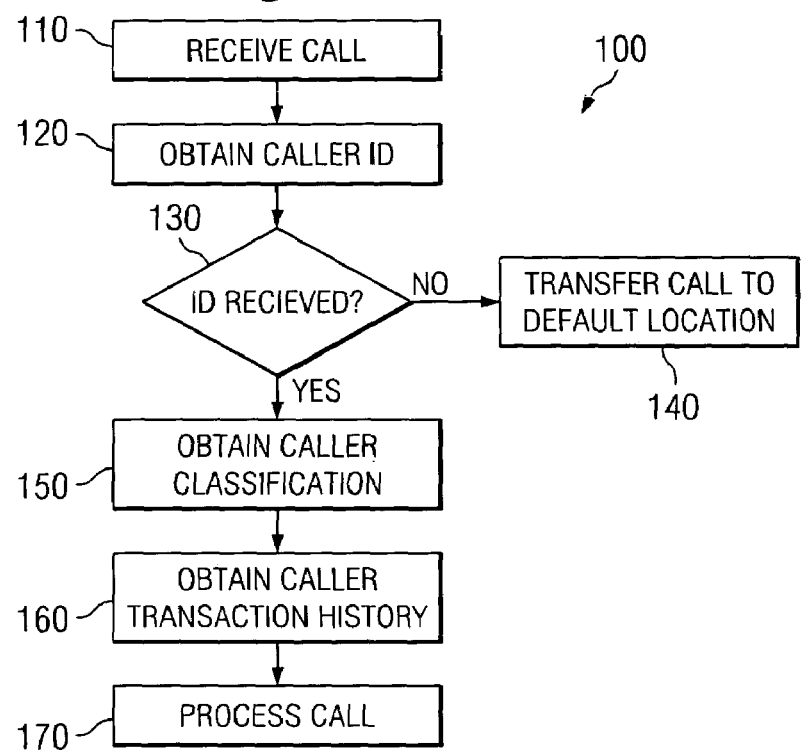
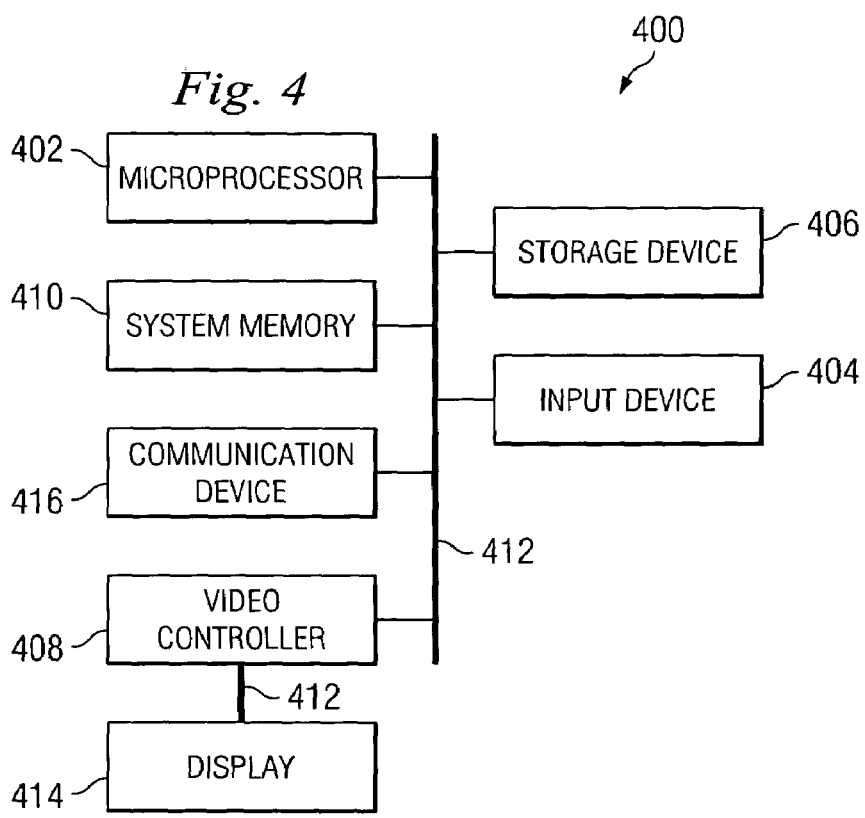

Fig. 2

CUSTOMER SERVICE TRANSACTION HANDLING BASED ON TRANSACTION HISTORY

BACKGROUND

Many merchants have telephone systems and other systems by which potential and existing customers may make purchases, accessing and modify existing order information, obtain product information, etc. Thus, quickly and accurately handling telephone calls or other types of customer service transactions is critical for merchants to maintain high levels of customer satisfaction. Moreover, customers that conduct repeated transactions with a particular merchant often expect to receive expedited or otherwise preferential treatment from merchants in return for their repeat business.

However, a large number of calls may be queued by such call-handling systems at any one time. Moreover, the queues in which these calls are placed while awaiting a customer service representative (be it human or computer) are often "first-in-first-out" queues, wherein customers are attended to in the order in which they accessed the call-handing system. Consequently, existing systems may not address customers that recently completed a significant number of transactions until after addressing other customers that recently completed fewer transactions.

BRIEF DESCRIPTION OF THE DRAWINGS

FIG. 1 is a flow-chart diagram of one embodiment of a method of handling customer service transactions according to aspects of the present disclosure.

FIG. 2 is a schematic view of several embodiments of queues for handling customer service transactions according to aspects of the present disclosure.

FIG. 4 is a diagram of one embodiment of a note for implementing the aspects of the present disclosure.

DETAILED DESCRIPTION

Figure 3:
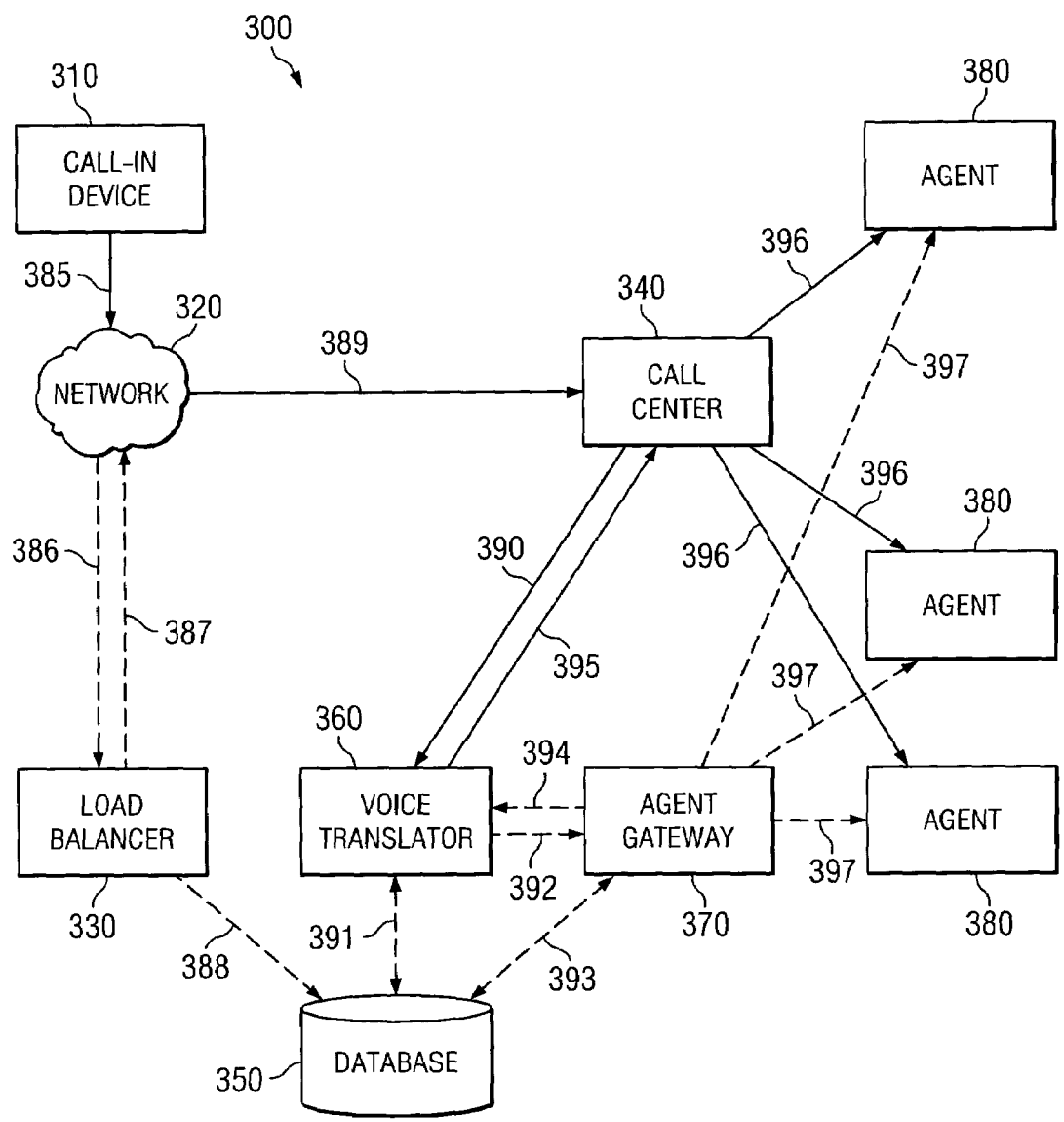
FIG. 3 is a block diagram of one embodiment of a system for handling customer service transactions according to aspects of the present disclosure.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, illustrated is a flow-chart diagram of one embodiment of a method 100 of handling customer service transactions according to aspects of the present disclosure. Such handling may comprise prioritizing customer service transactions, routing the transactions, and/or completing the transactions.

The customer service transactions depicted in FIG. 1 comprise telephone calls initiated by customers, such as calls placed to purchase tickets, products, or services provided by a merchant having employees, agents, and/or a call-handling system for handling the service transactions. For example, in one embodiment, one or more of the telephone calls and/or other types of customer service transactions (or means therefor) may be initiated to book (e.g., make) a reservation, receive information about airline flights (such as scheduled and/or actual departure and/or arrival times) or other merchant services, receive information about baggage handling or lost baggage or other articles (hereafter collectively referred to as lost article information), and/or to receive information pertaining to frequent-flyer, frequent-purchaser, and/or other customer appreciation programs.

However, the customer service transactions may also or alternatively comprise other types of transactions. For example, the transactions may be received by the merchant or call-handling system via a network other than a telephony network, including the internet, a wired network, a wireless network, a local area network, a wide area network, and/or combinations thereof. The transactions may also comprise requests for information in contrast to, or in addition to, purchase requests. For example, the transactions may comprise requests for product upgrades, order/stock confirmation, check-in, or any other call-handling system purposes, objectives, or uses.

Moreover, while many of the examples provided above and that follow pertain to transactions often conducted in the course of airline industry business, aspects of the present disclosure are applicable and/or readily adaptable to other industries, including rail, bus, cruise, and other travel or shipping industries, rental car industries, hotels and other hospitality industries, and others.

In the embodiment illustrated in FIG. 1, the method 100 includes an initial step 110 in which a telephone call is received from an existing or potential customer (hereafter collectively referred to as a customer). In a subsequent step 120, one or more attempts are made to obtain a customer ID from the customer. If the customer does not have a customer ID, or if for some other reason the call handling system fails to obtain the customer ID, the call is transferred to a default location, such as to a human representative, to route the call by default parameters and/or to complete the customer service transaction. Thus, the method 100 includes a decisional step 130 by which the call is transferred to a default location in a step 140 if no customer ID is obtained. Step 120 may also include obtaining a personal identification number or other customer-identification means (hereafter collectively referred to as a PIN) from the customer. The PIN may be a user-selected or assigned to the user, and may be employed with other identification or classification information. The PIN may also or alternatively be retrieved or verified in other steps in the method 100.

The method 100 also includes a step 150 in which a customer classification is obtained if the customer ID is successfully obtained in step 120, as determined by the decisional step 130. The customer's transaction history is then obtained in a step 160. The caller classification and/or the transaction history may be obtained from information provided by the customer (e.g., via spoken or keyed response) and/or by a database lookup employing the customer ID and/or the customer classification.

In a subsequent step 170, the call is processed based on the customer classification obtained in step 150 and/or the transaction history obtained in step 160. As described above, a PIN may be appended to or otherwise employed with the customer classification and/or transaction history during this and other steps. The processing performed in step 170 may comprise prioritization of the call based on the customer classification and/or transaction history for subsequent routing. Processing in the step 170 may additionally or alternatively include routing the call based on the prioritization and/or other analysis based on the customer classification and/or transaction history. The processing performed in step 170 may additionally or alternatively include completing the customer service transaction based on the customer classification and/or transaction history.

Any of the steps in the method 100 in which information may be obtained directly from the customer, such as obtaining the customer ID in step 120, the customer classification in step 150, and the customer transaction history in step 160, may employ voice recognition and/or translation apparatus. For example, the call-handling system may ask the customer a question and the customer may respond by providing a spoken response, in which case the call-handling system may include voice-recognition apparatus for converting the customer's spoken response into a digital response. However, the call-handling system may also be configured to accept keyed responses from the customer, such as from a number pad on the customer's telephone. Thus, for example, the call-handling system may be configured to accept dual-tone frequencies from the customer in addition to, or in the alternative to, spoken responses. The call-handling system may also be configured to confirm the customer's responses, such as by asking the customer to repeat the response or by repeating the response back to the customer and asking the customer to verify the accuracy of the response. The call-handling system may also be configured to request and receive a spoken and/or keyed PIN which may be employed as or with other identification and/or description information.

However, as mentioned above, the customer classification and/or the customer transaction history may also be obtained by performing a database lookup. In one embodiment, the call-handling system may maintain and/or access one or more integral or remote databases, such as an SQL database, an MSSQL database, an Oracle database, a Microsoft Access database, a SyBase database, a Dbase II database, or other database types. One or more records for each customer ID may be maintained in the database, wherein the records may comprise information pertaining to the customer associated with the customer ID, including the customer classification and transaction history. Thus, each customer ID may be associated with a customer classification and transaction history.

In one embodiment, the customer classification and/or transaction history may be associated with the phone number that the customer dialed to initiate the customer service transaction. For example, customers having a first classification and a transaction history within a first range may be provided a specific telephone number to dial to initiate customer service transactions, whereas other customers having a second classification and/or a transaction history within a second range may be provided a different telephone number. Accordingly, all calls received at a particular telephone number may be initiated by customers of similar classification and transaction history. The call-handling system may also verify that the customer has dialed the telephone number corresponding to customer's classification and transaction history. For example, the step 120 in the method 100 of FIG. 1, and/or another step, may include verifying a correspondence between the telephone number at which the call is received and the customer's classification and/or transaction history, either directly with the customer or by a database lookup. If it is determined that the customer should have dialed a different number to initiate the customer service transaction, the call may be routed to that number, and the method 100 may resume at step 150.

The customer classification obtained in step 150 may be one of a predetermined number of classifications. For example, if the call-handling system is configured to conduct airline ticket purchasing transactions, the classifications may include a first classification for customers who travel a minimum number miles on the airline during a calendar year, a second classification for customers who travel a predetermined amount more than the first classification customers, and a third classification for customers who travel more than the first and second classification customers. However, the specific number of classifications is not limited within the scope of the present disclosure.

The customer transaction history obtained in step 160 may be a transaction history range within which the customer's specific transaction history falls, such that the entire spectrum of transaction histories of all customers may be subdivided into a predetermined number of ranges. For example, one or more of the transaction history ranges may be based on merchant profit attributable to individual customers, such that a first range may represent customers that generated less than a minimum profit amount within a predetermined time period, a second range for customers that generated at least the minimum profit amount, and a third range for customers that generated at least a predetermined profit amount greater than the minimum profit amount. In one embodiment, one or more of the transaction history ranges may be based on the number of transactions completed by the customers, such that a first range may represent customers that completed less than a predetermined number of transactions within a predetermined time period, a second range may represent customers that completed at least the predetermined number of transactions, and a third range may represent customer that completed at least a predetermined number of transactions that is greater than the minimum number. One or more of the transaction history ranges may also be based on both the profit ranges and the transaction number ranges described above. Moreover, any number of transaction history ranges may be employed within the scope of the present disclosure.

The customer transaction history obtained in step 160 may also or alternatively be, comprise, or be based on one or more characteristics of the customer or customer's recent transactions. For example, the transaction history may take into account how recently the customer became a member of a merchant's customer appreciation program, such as a frequent-purchaser or frequent-flyer program. The transaction history may also be based on a customer's employment status at particular companies or government agencies. The transaction history may also be based on the type of the customer's recent transactions. For example, in the airline ticket transaction introduced above, the transaction history may be based on whether a customer recently purchased coach class tickets, business class tickets, or first class tickets.

One embodiment of the method 100 of handling customer service transactions according to aspects of the present disclosure employs transaction classifications instead of or in combination with the customer classifications. For example, the transaction classifications may comprise or be based on the type or nature of the transactions, such as whether the transaction relates to or comprises a purchase request, a request for product upgrade, an order/stock confirmation, a customer check-in, or any other purpose, objective, or use of a call-handling system. The transaction classifications may replace the role of the customer classifications described above during any grouping, ranking, or prioritizing operation within the scope of the present disclosure. Thus, references herein to customer classifications may contemplate classifications pertaining to customers as well as classifications pertaining to transactions requested by customers.

Figure 2:
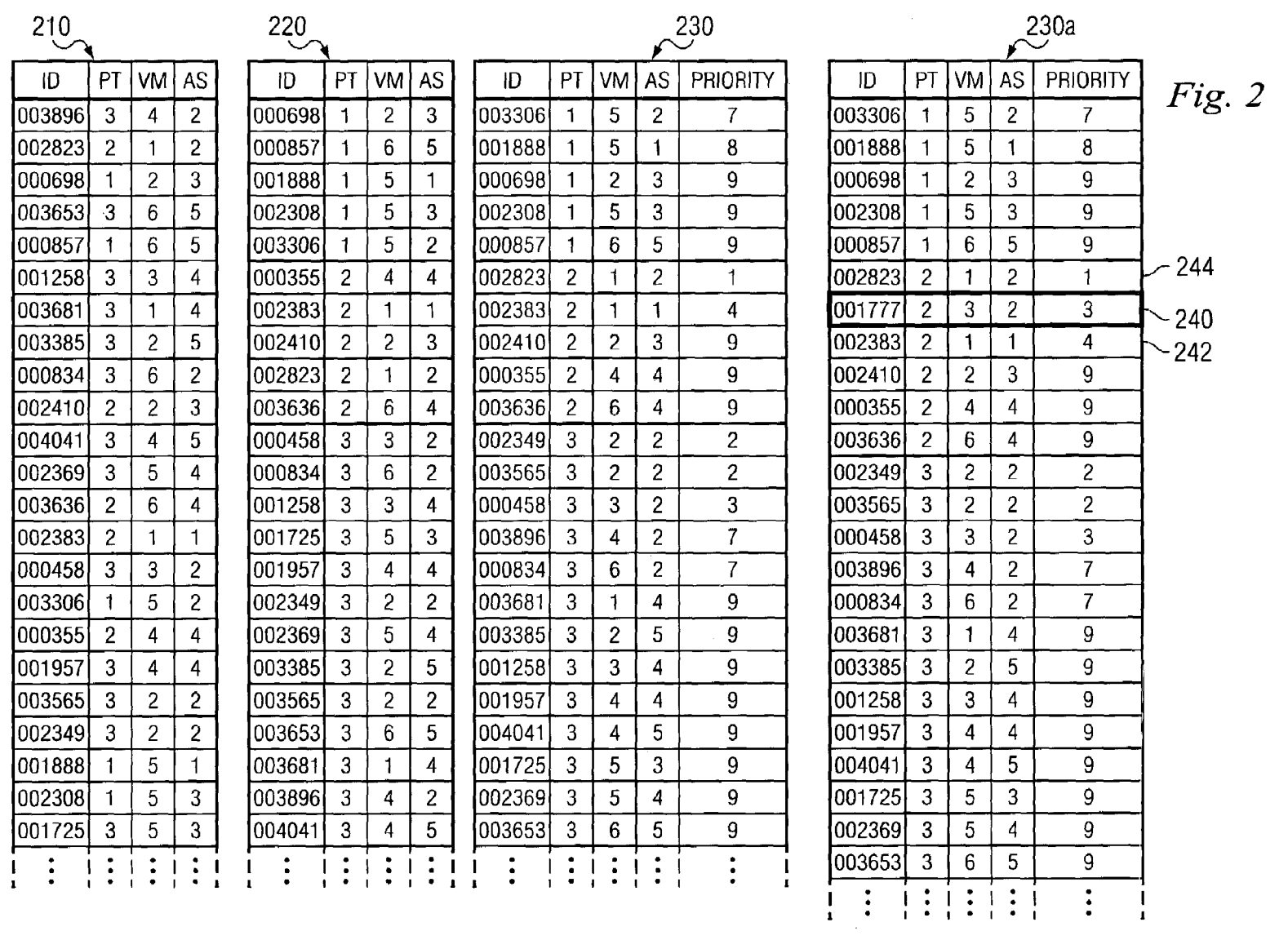

Referring to FIG. 2, illustrated are several embodiments of queues 210, 220, 230, 230a for buffering, prioritizing, and/or ranking a plurality of customer service transactions according to aspects of the present disclosure. The customer service transaction queue or buffer (hereafter collectively referred to as a queue) 210 may be configured for prioritizing customer service transactions as they are received by a call-handling system according to aspects of the present disclosure. The queue 210 may contain a dynamically changing number of customer service transactions (or indicators thereof) each identified by or associated with a customer ID. The queue 210 contains at least 23 transactions in the illustrated embodiment, although the size of the queue 210 is not limited by the present disclosure.

As described above, each customer may have a unique customer ID. The customer ID may be, include, or be based one or more different data, including a customer number in a particular commercial program (e.g., a frequent-flyer program customer number), a telephone or cellular phone number, a customer zip code or other address portion, a customer email address, a customer website address, a customer PIN, and/or a generic customer identifier not necessarily tied to any commercial program, including those selected by or assigned to the customer, among others.

In the illustrated embodiment, the transactions identified by each customer ID are queued in the order in which they are received by the call-handling system. However, one or more of the ranking and prioritizing steps described herein may be performed prior to or in conjunction with placing the calls in the queue 210.

Each of the customer service transactions shown in the queue 210 may be grouped according to a first criteria, such as by the customer classifications described above. The result of such grouping is shown in queue 220, wherein the groups are based on Program Tiers to which the customers belong. In the illustrated embodiment, each customer belongs to one of three Program Tiers, although any number of tiers or other criteria may be employed to group the transactions, and one of the groups to which a transaction may belong may indicate that the customer does not belong to any Program Tier. Such sorting may be performed prior to placing the transactions in any queue, such that the queue 220 is the first queue in which each transaction is placed, possibly eliminating the need for the queue 210.

After the customer service transactions are sorted, as shown in the queue 220, each transaction within a sorted group may be ranked or prioritized according to one or more additional criteria. For example, FIG. 2 also depicts queue 230 in which each group of sorted transactions are ranked based on a Value Metric (VM) and an Advocate Sector (AS). One embodiment of the Value Metrics is provided in Table 1, and one embodiment of the Advocate Sectors is provided in Table 2.

TABLE 1

| VM | Recent Profit | Recent Activity |
| --- | --- | --- |
| 1 | Greater than $C | At least 2 transactions |
| 2 | Between $C and $B | At least 2 transactions |
| 3 | Between $A and $B | At least 2 transactions |
| 4 | Less than $A | At least 2 transactions |
| 5 | Any value | Less than 2 transactions |
| 6 | Any value | Enrolled in program |

In the example provided in Table 1, predetermined profit amounts are indicated by $A, $B, and $C, wherein $C is a greater profit amount than $B, and $B is a greater profit amount than $A. Value Metric 1 applies to customers that completed at least two transactions during a predetermined time period (e.g., during the preceding 12 months) that resulted in a profit of greater than $C. Value Metric 2 applies to customers that completed at least two transactions during the predetermined time period that resulted in a profit of greater than $B but less than $C. Value Metric 3 applies to customers that completed at least two transactions during the predetermined time period that resulted in a profit of greater than $A but less than $B. Value Metric 4 applies to customers that completed at least two transactions during the predetermined time period that resulted in a profit of less than $A. In one embodiment, the profit amount $A is about zero profit. Value Metric 5 applies to customers that completed less than two transactions during the predetermined time period that resulted in any positive or negative amount of profit. Value Metric 6 applies to customers that completed less than two transactions during the predetermined time period that resulted in any positive or negative amount of profit, but that also joined the merchant's customer membership program within the predetermined time period, or another time period. The values represented by $A, $B, and $C may be adjusted or modified regularly, such as daily, monthly, and/or quarterly, or irregularly, such as on an as-needed basis.

TABLE 2

| AS | Description |
| --- | --- |
| 1 | At least 1 corporate account transaction during 1st time period |
| 1 | Military or government customer |
| 2 | At least 1 non-corporate account but business-oriented transaction during 1st time period |
| 2 | Member of business-oriented program but no corporate account |
| 3 | Enrolled in program within 2nd time period and not a member of another AS |
| 4 | Less than 5 transactions and earned at least X membership program points during 1st time period |
| 4 | No transactions and no membership points during 1st time period |
| 5 | All others (default) |

In the example provided in Table 2, several of the Advocate Sectors contain two types of customers. For example, Advocate Sector 1 applies to corporate customers that completed at least one corporate transaction during a first predetermined time period (e.g., during the preceding 12 months), and also applies to any military or government personnel requesting a military- or government-oriented transaction. Advocate Sector 2 applies to customers requesting a business-oriented transaction but not on a corporate account, and that completed at least one such transaction within the first predetermined time period. Advocate Sector 2 also applies to customers belonging to a business-oriented membership program of the merchant, but that does not have a corporate account with the merchant. Advocate Sector 3 applies to new members of one or more of the merchant's membership programs that aren't also members of any other Advocate Sector. Advocate Sector 4 applies to customers that completed less than 5 transactions within the first predetermined time period, but that also earned at least a predetermined number X of membership program points within the first predetermined time period. However, Advocate Sector 4 applies to members of the merchant's membership program that completed no transactions and earned no membership program points within the first predetermined time period. Advocate Sector 5 applies to all other customers, and is the default Advocate Sector.

As mentioned above, the transactions within each Program Tier may be ranked or prioritized based on the Value Metrics and Advocate Sectors corresponding to each transaction. One embodiment for such a prioritization scheme is shown in Table 3.

TABLE 3

| VM | AS | Priority |
|---|---|---|
| 1 | 2 | 0 |
| 2 | 2 | 1 |
| 3 | 2 | 2 |
| 1 | 1 | 3 |
| 2 | 1 | 4 |
| 3 | 1 | 5 |
| 4–6 | 2 | 6 |
| 4–6 | 1 | 7 |
| 1–6 | 3–5 | 8 |
| (incomplete VM or AS) | | 9 |

Thus, at least in the present example, customers in Advocate Sector 2 and to which Value Metric 1 applies may receive the highest priority in the call-handling system, followed by customers in Advocate Sector 2 to which Value Metric 2 applies and customers in Advocate Sector 2 to which Value Metric 3 applies. Such prioritization is shown in queue 230 in FIG. 2. The prioritization may also be performed prior to placing the transactions in any queue, such that the queue 230 is the first queue in which each transaction is placed, possibly eliminating the need for queues 210 and 220. As also illustrated in Table 3, customers may receive a low priority (priority level 9 in Table 3) if either or both of the Value Metrics or Advocate Sectors are missing. For example, in some embodiments customers may not be assigned a Value Metric or Advocate Sector, such as if the processing required to assign these characteristics or rankings has not yet completed, if the customer has insufficient history to perform the processing, or in the event of system bugs or glitches, among other reasons.

The present disclosure is also not limited to the prioritization and/or ranking based on only two factors, or even the two specific factors (VM and AS) in the example provided in Table 3. That is, the prioritization and/or ranking exemplified in Table 3 may be based on additional and/or other factors, including more than two factors. Also, the number of Value Metrics may be more or less than the six described as an example herein, and the number of Advocate Sectors may be more or less than the five described as an example herein.

Once the queue 230 becomes at least partially populated by received transactions, either as an initial queue or as a prioritized version of queue 220, subsequently received transactions may be placed into the queue 230 based on the Program Tier, Value Metric, and Advocate Sector associated with the new transaction. For example, queue 230a represents the modification of queue 230 after the insertion of a new transaction 240 identified by or associated with the customer ID 001777. The new transaction 240 is associated with Program Tier 2, Value Metric 3, and Advocate Sector 2, thereby having a priority that is greater than the priority of the transaction 242 associated with the customer ID 002383 but less than the priority of the transaction 244 associated with the customer ID 002823.

The prioritization that may be performed before or after a customer service transaction is placed in a queue may also include safeguards against allowing queued customer service transactions to be continually superceded by new customer service transactions. For example, without such safeguards, it is possible that a customer service transaction of the lowest possible priority within a group could be eternally kept within the queue as new, higher priority transactions are received. Thus, the prioritization of transactions within a group may also be based on the amount of time that queued transactions have been queued. For example, transactions that have been queued for at least one minute (or any other predetermined, possibly adjustable time period) but having lower Value Metric and Advocate Sector scores may be assigned higher priority than more recently queued transactions having higher Value Metric and Advocate Sector scores. In one embodiment, transactions of any Value Metric and/or Advocate Sector that have been queued for at least five minutes (or some other predetermined time period) may be reprioritized to the highest priority within a group.

Referring to FIG. 3, illustrated is a block diagram of one embodiment of a system 300 for handling customer service transactions according to aspects of the present disclosure. The system 300 is one environment in which the method 100 shown in FIG. 1 may be implemented, and may utilize one or more of the queues 210, 220, 230, 230a shown in FIG. 2.

The system 300 may include at least one call-in device 310 by which a customer may initiate a customer service transaction. In some embodiments the call-in device 310 may not be integral to the system 300, but may be a remote device temporarily in communication with the network 320 to access or otherwise work in conjunction with the system 300. The call-in device 310 may be a telephone, computer, PDA, or other device configured to allow wired or wireless access to the system 300 by the customer, and may be configured to provide voice and/or data signals to the system, including via a DTMF, touch-tone, or other type of key pad or user-input device.

The system 300 also includes a network 320 configured to allow communication between the call-in device 310 and other components in the system 300. The network 320 may be wired, wireless, or a combination thereof, and may be or comprise one or more of a local-area-network (LAN), a wide-area-network (WAN), and/or or other conventional and/or future-developed network types. Moreover, one or more of the networks represented by the network 320 may be centrally or remotely located relative to each other and/or the remainder of the system 300.

The system 300 may also include a load balancer 330. The load balancer 330 may route incoming calls to call centers, such as call center 340, based on one or more criteria. For example, the load balancer 330 may route calls based on the phone number dialed by the customer via the call-in device 310. The load balancer 330 may also route calls based on the phone number of the call-in device 310, or based on a characteristic of the customer. For example, the Program Tier, Value Metric, Advocate Sector, or other characteristic (e.g., a dialed number, a dialed-from number, an answered number, a dialed-and-answered number, etc.) associated with a customer may determine or influence where that customer's calls are routed by the load balancer 330. Thus, the load balancer 330 may be configured to access or communicate with a database 350 comprising information records pertaining to customers of the merchant for which the system 300 is maintained.

The call center 340 may be or comprise a switching component (e.g., hardware and/or software, such as a softswitch) for directing calls to the agents 380. The call center 340 may also be configured to queue the calls as they await action by an agent 380. The call center 340 may also be configured to direct the calls to other components within the system 300, such as a voice translator 360 to obtain additional information pertaining to the customer and/or the customer's request. The system 300 may also include a plurality of call centers 340, although only one call center 340 is shown in the embodiment of FIG. 3.

The database 350 may be an SQL database, an MSSQL database, an Oracle database, a Microsoft Access database, a SyBase database, a Dbase II database, or other type of database, and may include a number of databases, including centrally and/or remotely located databases, parallel databases, series databases, and nested databases. In one embodiment, the database 350 comprises at least one record for each customer which has enrolled in the merchants membership reward program and/or has previously conducted a transaction with the merchant. Each of such records may comprise information pertaining to the classification, Value Metric, and/or Advocate Sector corresponding to the customer, among other information.

The voice translator 360 may be configured to translate digital signals into computerized speech for asking customers questions to obtain information necessary to complete a customer service transaction. The voice translator 360 may also be configured to translate spoken responses by customers into digital information to be employed by other components in the system 300. The spoken responses may comprise information pertaining to a customer or caller ID, Program Tier, type of transaction requested, and/or other characteristic of the caller or transaction. In one embodiment, the voice translator 360 may be located and/or interconnected within or to the system 300 other than or in addition to as shown in FIG. 3. For example, one or more voice translators 360 may be connected to or otherwise configured to communicate with the network 320, such that the translation that may be performed by the voice translator 360 may occur before a call is handled by the call center 340 and/or before the load balancer 330 is accessed, for any particular call.

The system 300 also includes one or more agents 380 for completing customer service transactions. The agents 380 may comprise human representatives, employees, or agents of the merchant. The agents 380 may also comprise computerized or automated agents capable of corresponding with a customer. For example, the agents 380 may be capable of translating digital signals into computerized speech for presenting questions to a customer, as well as translating keyed (e.g., DTMF tones) or spoken responses from the customer into signals employed to complete a customer service transaction. The agents 380 may be subdivided into groups corresponding to the particular nature of the customer service transactions and/or groups of the customers. For example one or more agents 380 may only handle transactions relating to purchases of a specific product or product line, or one or more agents 380 may only handle transactions initiated by customers having a specific classification, Value Metric, and/or Advocate Sector associated therewith.

In one embodiment of operation of the system 300, a call between the call-in device 310 and the network 320 is initiated by a customer, as indicated by solid arrow 385. The call is answered by the network 320, at which time the customer may receive one or more requests for information. The customer may answer the requests via spoken or keyed responses. The responses by the customer may comprise information identifying the customer, such as a caller ID, and/or indicating the type of customer service transaction the customer wishes to initiate, such as purchasing or requests for information. The network 320 may then send a routing query to the load balancer 330, as indicated by the dashed arrow 386.

The load balancer 330 may then determine which call center 340 is best able to handle the type of call and directs the network 320 to send the call to that call center 340, as indicated by the dashed arrow 387. The load balancer 330 may access the database 350 in making this determination, as indicated by the dashed arrow 388, such as to obtain information pertaining to the customer and the type of transactions permitted for the customer within the system 300. The call may then be routed to the specified call center 340 per the direction provided by the load balancer 330, as indicated by the solid arrow 389.

The call may then be transferred to the voice translator 360, as indicated by the solid arrow 390. As described above, the voice translator 360 may be configured to ask the caller one or more questions and to receive spoken and/or keyed responses from the caller. Accordingly, the voice translator 360 may obtain a caller ID from the caller. The voice translator 360 may then send the caller ID to the database 350 or otherwise communicate with the database 350, as indicated by the dashed arrow 391. Accordingly, the voice translator 360 may obtain information from the database 350 corresponding to the caller ID, such as the Program Tier corresponding to the customer, a telephone number, an area code, a zip code or other postal address portion, or an email or other electronic address, among others.

A routing request may then be sent to the agent gateway 370, accompanied by the caller ID and Program Tier information previously obtained, as indicated by the dashed arrow 392. The agent gateway 370 may then obtain the Value Metric and/or Advocate Sector from the database 350, as indicated by the dashed arrow 393, or from another source integral to or remote from the system 300.

The agent gateway 370 may then direct the voice translator 360 to send the call to the appropriate call center 340, possibly indicating how to prioritize the call based on the Program Tier, Value Metric, and/or the Advocate Sector, as indicated by the dashed arrow 394. The call may then be sent to the call center 340, as indicated by the solid arrow 395. The call may then be sent to one of the agents 380, or may be retrieved by one of the agents 380, according to the grouping, prioritization, and/or ranking based on the Program Tier, Value Metric, Advocate Sector, and/or other characteristics or information, as indicated by the solid arrows 396. Information pertaining to the nature of the customer service transaction and/or the customer, such as the associated Program Tier, Value Metric, and/or Advocate Sector, may also be sent to or retrieved by the appropriate agent 380, as indicated by the dashed arrows 397.

In each of the instances described above in which a call is transferred between components of the system 300 described above, as well as those not described, the call may be prioritized and/or ranked relative to other calls queued or otherwise pending at the sending or received component. Moreover, any prioritization of a call within the system 300 may be based on one or more of the order of receipt at the network 320 or other component, the caller ID, the caller classification, the corresponding Value Metric, the corresponding Advocate Sector, the Program Tier, the elapsed time since the call was received by the network 320, the elapsed time since the call was last acted upon by any or a particular component of the system 300, and/or other factors.

Thus, the present disclosure provides a method of routing a plurality of calls received by a call routing system, including grouping each of the plurality of received calls based on a plurality of customer classifications each associated with one of a plurality of customers each corresponding to one of the plurality of received calls. Each of the plurality of received calls are ranked based on a plurality of transaction histories each associated with one of the plurality of customers. Each of the plurality of received calls are routed based on the grouping and the ranking.

The present disclosure also provides a method of prioritizing a plurality of customer service transactions for performance thereof. In one embodiment, the method includes determining a plurality of customer classifications each corresponding to one of a plurality of customers each associated with one of the plurality of customer service transactions. Such an embodiment also includes determining a plurality of transaction histories each corresponding to one of the plurality of customers. Ones of the plurality of customer service transactions are prioritized based on corresponding ones of the plurality of customer classifications and the plurality of transaction histories.

The present disclosure also introduces a system for handling a plurality of customer service transaction requests. In one embodiment, the system includes a database accessible to retrieve a plurality of transaction histories each associated with one of the plurality of customer service transaction requests. The system also includes a router configured to prioritize ones of the plurality of customer service transaction requests based on the plurality of transaction histories.

Another embodiment of a method of routing a plurality of calls received by a call routing system according to aspects of the present disclosure includes grouping each of the plurality of received calls based on a plurality of transaction classifications, wherein each of the plurality of transaction classifications is associated with one of a plurality of transactions, and wherein each of the plurality of transactions corresponds to one of the plurality of received calls. Each of the plurality of received calls is ranked based on a plurality of transaction histories, wherein each of the plurality of transaction histories is associated with one of a plurality of customers, and wherein each of the plurality of customers is associated with one of the plurality of transactions. Each of the plurality of received calls is routed based on the grouping and the ranking.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring to FIG. 4, an illustrative node 400 for implementing an embodiment of the method is depicted. Node 400 includes a microprocessor 402, an input device 404, a storage device 406, a video controller 408, a system memory 410, and a display 414, and a communication device 416 all interconnected by one or more buses 412. The storage device 406 could be a floppy drive, hard drive, CD-ROM, optical drive, or any other form of storage device. In addition, the storage device 406 may be capable of receiving a floppy disk, CD-ROM, DVD-ROM, or any other form of computer-readable medium that may contain computer-executable instructions. Further communication device 416 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Furthermore, hardware typically includes any physical device that is capable of storing machine-readable instructions, such as memory or other data storage devices. Other forms of hardware include hardware sub-systems, including transfer devices such as modems, modem cards, ports, and port cards, for example. Hardware may also include, at least within the scope of the present disclosure, multi-modal technology, such as those devices and/or systems configured to allow users to utilize multiple forms of input and output—including voice, keypads, and stylus—interchangeably in the same interaction, application, or interface.

Software includes any machine code stored in any memory medium, such as RAM or ROM, machine code stored on other devices (such as floppy disks, or a CD ROM, for example), and may include executable code, an operating system, as well as source or object code, for example. In addition, software encompasses any set of instructions capable of being executed in a client machine or server—and, in this form, is often called a program or executable code.

Hybrids (combinations of software and hardware) are becoming more common as devices for providing enhanced functionality and performance to computer systems. A hybrid is created when what are traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer and effectively transform a standard computer into a new specific computing machine.

Data structures are defined organizations of data that may enable an embodiment of the invention. For example, a data structure may provide an organization of data, or an organization of executable code (executable software). Furthermore, data signals are carried across transmission mediums and store and transport various data structures, and, thus, may be used to transport an embodiment of the invention. It should be noted in the following discussion that acts with like names are performed in like manners, unless otherwise stated.

The system may be designed to work on any specific architecture. For example, the system may be executed on a single computer, Ethernet networks, local area networks, a wide area network, internets, hand-held and other portable and wireless devices and networks.

A database may be any standard or proprietary database software, such as SQL, MSSQL, Oracle, Microsoft Access, SyBase, or DBase II, for example. Accordingly, the database has fields, records, data, and other database elements which may be associated through database specific executable software code. Mapping is the process of associating one data entry with another data entry. For example, the data contained in the location of a character file can be mapped to a field in a second table. The physical location of the database is not limiting, and the database may be distributed. For example, the database may exist remotely from the server, or run on a separate platform that is accessible across the Internet. Note that more than one database may be implemented in an architecture.

While the examples and naming conventions used herein have been related to air travel, it is understood that the system and method for customer service transaction handling based on transaction history could be used in any form of travel, hospitality, and/or logistics industry, including the rail industry, cruise industry, shipping industry, hotels, and bus travel.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of routing a plurality of calls received by a call routing system, comprising:
   grouping each of the plurality of received calls based on a plurality of customer classifications, each of the plurality of customer classifications associated with one of a plurality of customers, and each of the plurality of customers corresponding to one of the plurality of received calls;
   ranking each of the plurality of received calls based on a plurality of transaction histories, each of the plurality of transaction histories associated with one of the plurality of customers; and
   routing each of the plurality of received calls based on the grouping and the ranking.

2. The method of claim 1 wherein routing includes prioritizing ones of the plurality of received calls based on the grouping and ranking.

3. The method of claim 1 wherein the plurality of transaction histories includes a plurality of value metrics each associated with at least one of the plurality of customers.

4. The method of claim 1 wherein the plurality of transaction histories includes a plurality of advocate sectors each associated with at least one of the plurality of customers.

5. The method of claim 1 wherein the plurality of transaction histories includes:
   a plurality of value metrics each associated with at least one of the plurality of customers; and
   a plurality of advocate sectors each associated with at least one of the plurality of customers.

6. The method of claim 1 wherein the plurality of transaction histories includes a plurality of profitability data each associated with one of the plurality of customers.

7. The method of claim 1 wherein at least one of the plurality of customer classifications and the plurality of transaction histories is obtained from a spoken response of a corresponding one of the plurality of customers.

8. The method of claim 1 wherein at least one of the plurality of calls is initiated by one of the plurality of customers to purchase an airline ticket.

9. The method of claim 1 wherein at least one of the plurality of calls is initiated by one of the plurality of customers to book a reservation.

10. The method of claim 1 wherein at least one of the plurality of calls is initiated by one of the plurality of customers to receive flight information.

11. The method of claim 1 wherein at least one of the plurality of calls is initiated by one of the plurality of customers to receive lost article information.

12. The method of claim 1 wherein at least one of the plurality of calls is initiated by one of the plurality of customers to receive customer appreciation program information.

13. The method of claim 1 wherein the plurality of customer classifications includes three customer classifications each based on a number of points that ones of the plurality of customers have earned in an airline frequent-flyer program.

14. The method of claim 1 wherein the plurality of transaction histories are each based on at least one of:
   one of a plurality of profitability ranges associated with the plurality of customers; and
   one of a plurality of ranges of numbers of transactions completed by the plurality of customers.

15. The method of claim 1 wherein ranking includes ranking each of the plurality of received calls based on an amount of time elapsed since a predetermined event and corresponding to one of the plurality of received calls.

16. The method of claim 15 wherein the predetermined event comprises receipt of the one of the plurality of received calls.

17. A method of prioritizing a plurality of customer service transactions for performance thereof, comprising:
   receiving a customer service transaction from a customer:
   associating one of a plurality of customer classifications to the customer;
   identifying a transaction history corresponding to the customer; and
   prioritizing the customer service transactions based on the one of the plurality of customer classifications and the transaction history.

18. The method of claim 17 wherein the transaction history includes a measure of historical profitability corresponding to the customers.

19. The method of claim 17 wherein the transaction history includes a number of transactions previously completed by the customers.

20. The method of claim 17 wherein the transaction history comprises an affiliation of the customers with a corporate entity.

21. The method of claim 17 wherein the transaction history comprises an affiliation of the customers with a military entity.

22. The method of claim 17 wherein the transaction history comprises an affiliation of the customers with a government entity.

23. The method of claim 17 wherein the transaction history comprises a membership status of the customer in a merchant customer rewards program.

24. The method of claim 17 wherein at least one of associating one of a plurality of customer classifications and identifying a transaction history comprises obtaining information from a database employing a customer ID.

25. A method of prioritizing a first customer service transaction relative to a plurality of second customer service transactions, comprising:
 determining a first customer classification corresponding to a first customer and associated with the first customer service transaction;
 determining a first transaction history corresponding to the first customer; and
 comparing the first customer classification and the first transaction history with ones of a plurality of second customer service transactions and ones of a plurality of second transaction histories, respectively, each corresponding to the plurality of second customer service transactions.

26. The method of claim 25 further comprising associating a first priority ranking with the first customer service transaction by employing a prioritization matrix relating a plurality of predetermined transaction history metrics to a plurality of predetermined priority rankings.

27. The method of claim 26 wherein comparing comprises comparing the first priority ranking with a plurality of second priority rankings each corresponding to one of the second customer service transactions.

28. The method of claim 26 wherein the prioritization provides a priority ranking for each of a plurality of combinations of one of a plurality of Value Metrics and one of a plurality of Advocate Sectors.

29. The method of claim 26 wherein determining a first customer classification comprises accessing a database employing a phone number dialed by the first customer to initiate the first customer service transaction.

30. The method of claim 26 wherein determining a first customer classification comprises accessing a database employing a customer ID associated with the first customer.

31. The method of claim 26 further comprising obtaining the customer ID from the first customer.

32. The method of claim 31 wherein obtaining the customer ID comprises asking the first customer to provide the customer ID and receiving from the first customer a spoken response.

33. The method of claim 31 wherein obtaining the customer ID comprises asking the first customer to provide the customer ID and receiving from the first customer a keyed response.

34. A computer-readable medium comprising a series of instructions for execution by at least one computer processor, wherein the instructions are for:
 determining a first customer classification corresponding to a first customer and associated with the first customer service transaction;
 determining a first transaction history corresponding to the first customer; and
 comparing the first customer classification and the first transaction history with ones of a plurality of second customer service transactions and ones of a plurality of second transaction histories, respectively, each corresponding to the plurality of second customer service transactions.

35. A method of routing a plurality of customer service transaction requests received by a customer service transaction request routing system, comprising:
 grouping each of the plurality of received customer service transaction requests based on a plurality of customer classifications, each of the plurality of customer classifications associated with one of a plurality of customers, and each of the plurality of customers corresponding to one of the plurality of received customer service transaction requests;
 ranking each of the plurality of received customer service transaction requests based on a plurality of transaction histories, each of the plurality of transaction histories associated with one of the plurality of customers; and
 routing each of the plurality of received customer service transaction requests based on the grouping and the ranking.

36. The method of claim 35 wherein the plurality of customer service transaction requests comprise a plurality of travel reservation requests.

37. The method of claim 36 wherein the plurality of travel reservation requests comprise airline travel reservation requests.

38. The method of claim 36 wherein the plurality of travel reservation requests comprise rail travel reservation requests.

39. The method of claim 36 wherein the plurality of travel reservation requests comprise bus travel reservation requests.

40. The method of claim 36 wherein the plurality of travel reservation requests comprise car travel reservation requests.

41. The method of claim 36 wherein the plurality of travel reservation requests comprise cruise travel reservation requests.

42. The method of claim 36 wherein the plurality of travel reservation requests comprise hospitality industry reservation requests.

* * * * *

UNITED STATES PATENT AND TRADEMARK OFFICE
CERTIFICATE OF CORRECTION

| | | |
|---|---|---|
| PATENT NO. | : 7,146,002 B1 | Page 1 of 1 |
| APPLICATION NO. | : 10/881571 | |
| DATED | : December 5, 2006 | |
| INVENTOR(S) | : Carline A. Smith et al. | |

It is certified that error appears in the above-identified patent and that said Letters Patent is hereby corrected as shown below:

Column 14, Claim 18, line 59 "customers" should be -- customer --

Column 14, Claim 19, line 62 "customers" should be -- customer --

Column 14, Claim 20, line 64 "customers" should be -- customer --

Column 14, Claim 21, line 67 "customers" should be -- customer --

Column 15, Claim 22, line 2 "customers" should be -- customer --

Signed and Sealed this

Third Day of June, 2008

JON W. DUDAS
*Director of the United States Patent and Trademark Office*